United States Patent [19]
Simmons et al.

[11] Patent Number: 6,086,142
[45] Date of Patent: Jul. 11, 2000

[54] ADJUSTABLE OPERATOR STATION FOR A WORK MACHINE AND AN ASSOCIATED METHOD FOR POSITIONING AN OPERATOR STATION RELATIVE TO A CAB FLOOR OF A WORK MACHINE

[75] Inventors: Gerald P. Simmons, Morton; Ronald L. Saltzer, Princeville; Jeffrey A. Moore, Waterman; Lynn A. Sutton, Kewanee, all of Ill.

[73] Assignee: Caterpillar Inc., Peoria, Ill.

[21] Appl. No.: 09/088,597

[22] Filed: Jun. 1, 1998

[51] Int. Cl.⁷ ................................................. B62D 33/06
[52] U.S. Cl. ............................... 296/190.01; 296/198.08; 296/65.01; 296/65.11; 296/65.13; 297/344.26
[58] Field of Search ................ 296/190.01, 190.08, 296/190.04, 190.05, 65.06, 65.11, 65.13, 65.14, 65.01, 63; 297/241, 344.21, 344.24, 344.22, 344.26; 180/89.13, 89.12; 278/299.1

[56] References Cited

U.S. PATENT DOCUMENTS

| | | |
|---|---|---|
| 3,398,894 | 8/1968 | Ajero . |
| 4,008,500 | 2/1977 | Hall, Jr. . |
| 4,026,379 | 5/1977 | Dunn et al. . |
| 4,059,171 | 11/1977 | Pakosh . |
| 4,134,617 | 1/1979 | Matsubara ...................... 297/344.26 X |
| 4,194,716 | 3/1980 | Barecki et al. . |
| 4,200,166 | 4/1980 | Hansen . |
| 4,262,958 | 4/1981 | Houseman et al. . |
| 4,400,032 | 8/1983 | DePolo ........................... 297/344.26 X |
| 4,709,649 | 12/1987 | Wann ............................. 297/344.26 X |
| 5,086,869 | 2/1992 | Newberry et al. ................... 180/89.13 |
| 5,620,230 | 4/1997 | Wu ........................................... 297/241 |

Primary Examiner—Joseph D. Pape
Attorney, Agent, or Firm—Maginot, Addison & Moore

[57] ABSTRACT

A work machine having an adjustable operator station including a cab having a floor and an operator station. The operator station has (i) a platform which is pivotally mounted to the floor, (ii) a pair of rollers which are secured to the platform, wherein the pair of rollers contact the floor so as to support the support structure above the floor, and (iii) a seat secured to the platform. The work machine further includes a locking mechanism for locking the platform at any one of a plurality of positions relative to the floor. An associated method for positioning the operator station relative to the cab floor of the work machine is also disclosed.

20 Claims, 4 Drawing Sheets

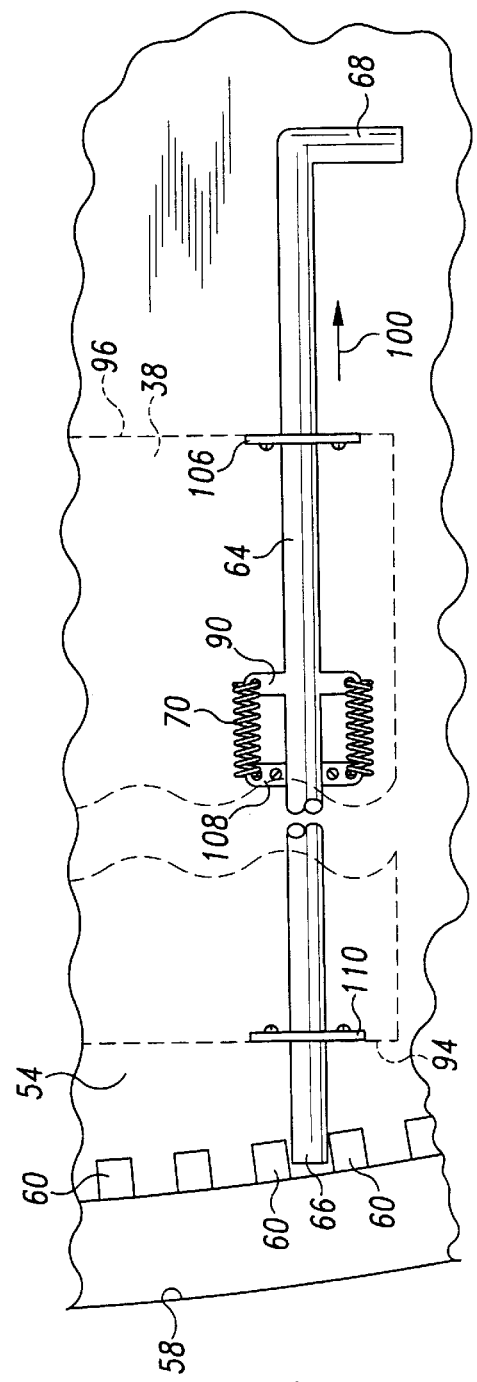
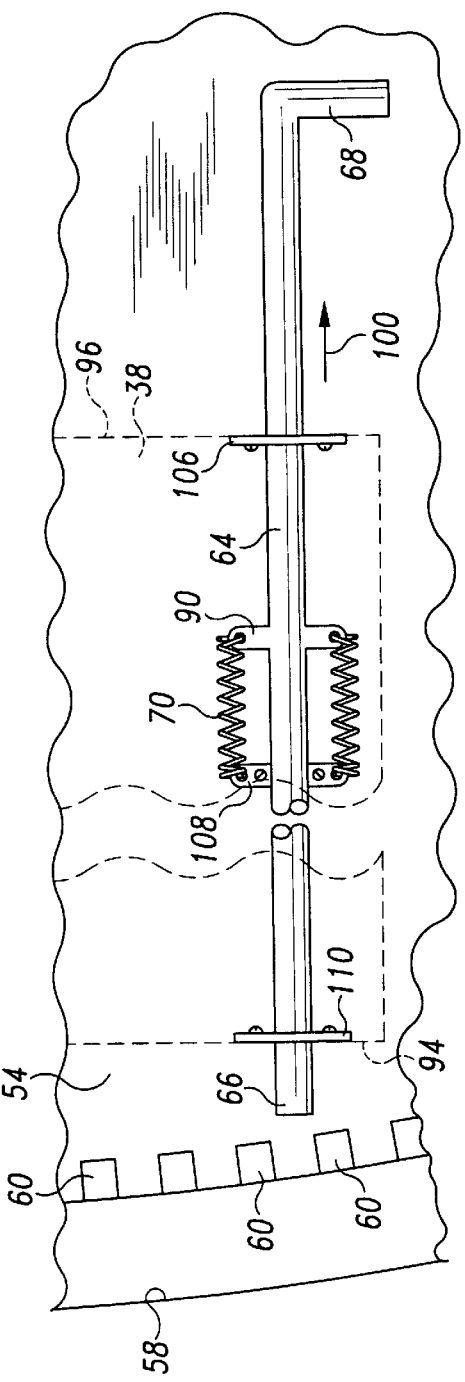

ADJUSTABLE OPERATOR STATION FOR A WORK MACHINE AND AN ASSOCIATED METHOD FOR POSITIONING AN OPERATOR STATION RELATIVE TO A CAB FLOOR OF A WORK MACHINE

TECHNICAL FIELD OF THE INVENTION

The present invention relates generally to an operator station for a work machine, and more particularly to an adjustable operator station for a work machine.

BACKGROUND OF THE INVENTION

Certain types of work machines, such as agricultural tractors, may be used to plant, cultivate, and harvest crops. Agricultural tractors (hereinafter referred to as "tractors") typically include a stationary seat mounted behind an engine compartment of the tractor. An operator is positioned within the seat and manipulates controls so as to direct movement of the tractor, and any agricultural implement attached thereto, during operation of the tractor.

However, a disadvantage with the above described arrangement is that the physical structure of the engine compartment of the tractor may partially obstruct the forward view of the operator during the performance of a work function. Under certain circumstances this partial obstruction can cause the destruction of valuable crops. For example, having an obstructed view may cause the operator to misalign the undercarriage of the tractor with the crop rows and thus crush a number of plants.

In attempt to address this problem the operator will typically lean either to the right or the left of the engine compartment in order to have a better view in front of the tractor. Having a better view helps the operator align the undercarriage of the tractor with the crop rows and thus avoid crushing the plants. However, continually leaning to the right or the left of the engine compartment is undesirable since it is inconvenient for the operator.

What is needed therefore is an operator station for a work machine which overcomes the abovementioned drawback.

DISCLOSURE OF THE INVENTION

In accordance with a first embodiment of the present invention, there is provided a work machine which includes (i) a cab having a floor and (ii) an operator station. The operator station has (i) a support structure which is movably mounted to the floor at a first end portion thereof, (ii) a roller which is secured to the support structure at a second end portion thereof, wherein the roller contacts the floor so as to support the support structure above the floor, and (iii) a seat secured to the support structure.

In accordance with a second embodiment of the present invention, there is provided a method for positioning an operator station relative to a cab floor of a work machine, wherein the operator station has (i) a support structure which is movably mounted to the cab floor at a first end portion thereof, (ii) a roller which is secured to the support structure at a second end portion thereof, (iii) a seat secured to the support structure, and (iv) a locking mechanism for locking the support structure in relation to the floor. The method includes the steps of (A) unlocking the support structure in relation to the cab floor when the support structure possesses a first orientation relative to the cab floor, (B) rolling the support structure on the roller in an arcuate path of movement from the first orientation in relation to the cab floor to a second orientation in relation to the cab floor, and (C) locking the support structure in relation to the cab floor when the support structure possesses the second orientation in relation to the floor.

In accordance with a third embodiment of the present invention, there is provided a work machine which includes (i) a cab having a floor and (ii) an operator station. The operator station has (i) a platform which is pivotally mounted to the floor, (ii) a pair of rollers which are secured to the platform, wherein the pair of rollers contact the floor so as to support the support structure above the floor, and (iii) a seat secured to the platform. The work machine further includes a locking mechanism for locking the platform at any one of a plurality of positions relative to the floor.

In accordance with a fourth embodiment of the present invention, there is provided a work machine which includes (i) a cab having a floor and (ii) an operator station. The operator station has (i) a support structure which is movably mounted to the floor at a first end portion thereof, (ii) a bearing member which is secured to the support structure at a second end portion thereof, the bearing member contacts the floor so as to support the support structure above the floor, and (iii) a seat secured to the support structure. The work machine also includes a locking mechanism for locking the support structure at any one of a plurality of positions relative to the floor.

BRIEF DESCRIPTION OF THE DRAWINGS

FIG. 4 is a top elevational fragmentary view of the locking mechanism of the operator station shown in FIG. 1, with the locking rod located in the locked position; and FIG. 5 is a view similar to FIG. 4, but showing the locking rod located in the unlocked position.

BEST MODE FOR CARRYING OUT THE INVENTION

Figure 1:
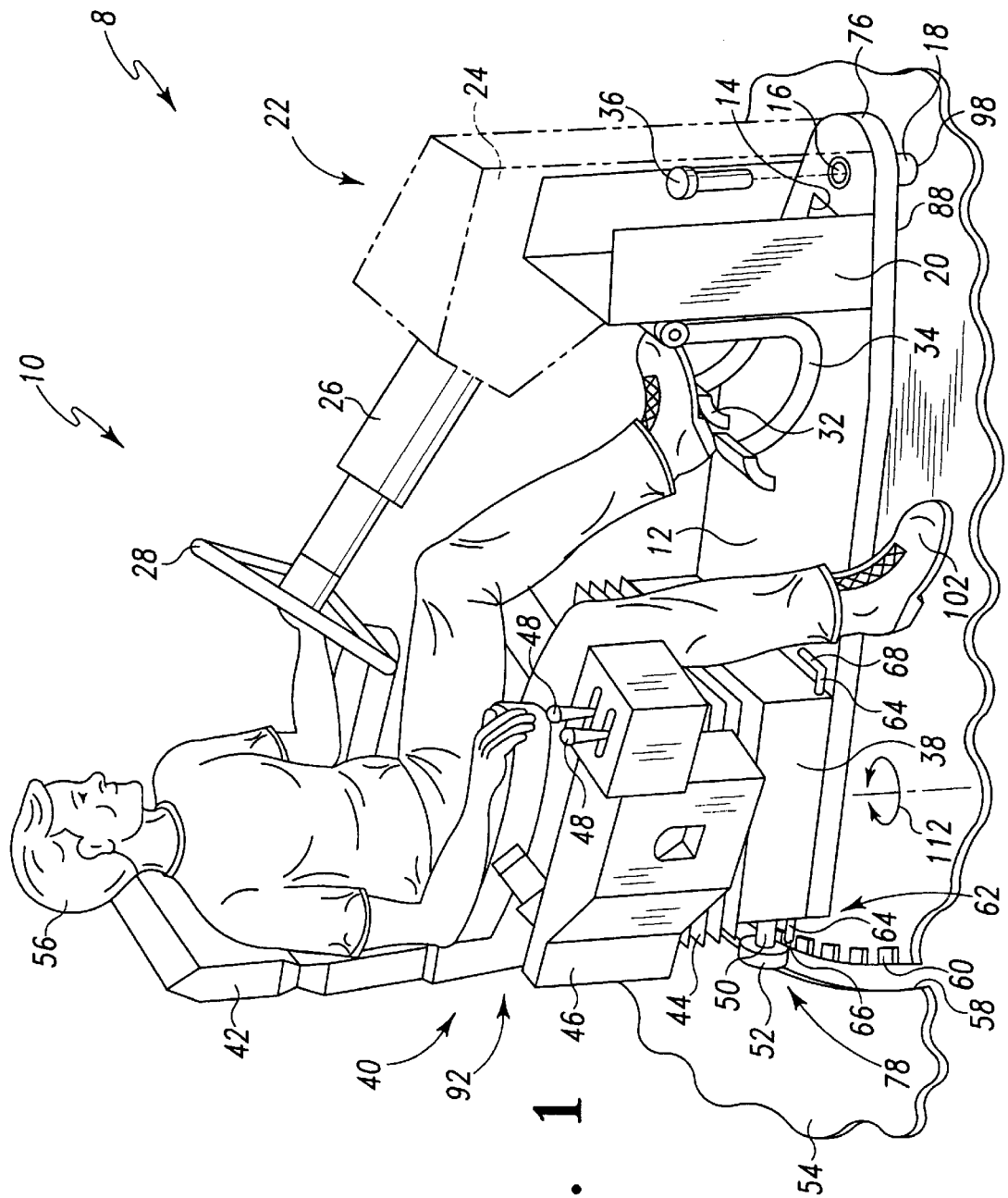
FIG. 1 is a perspective view of an operator station of a work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
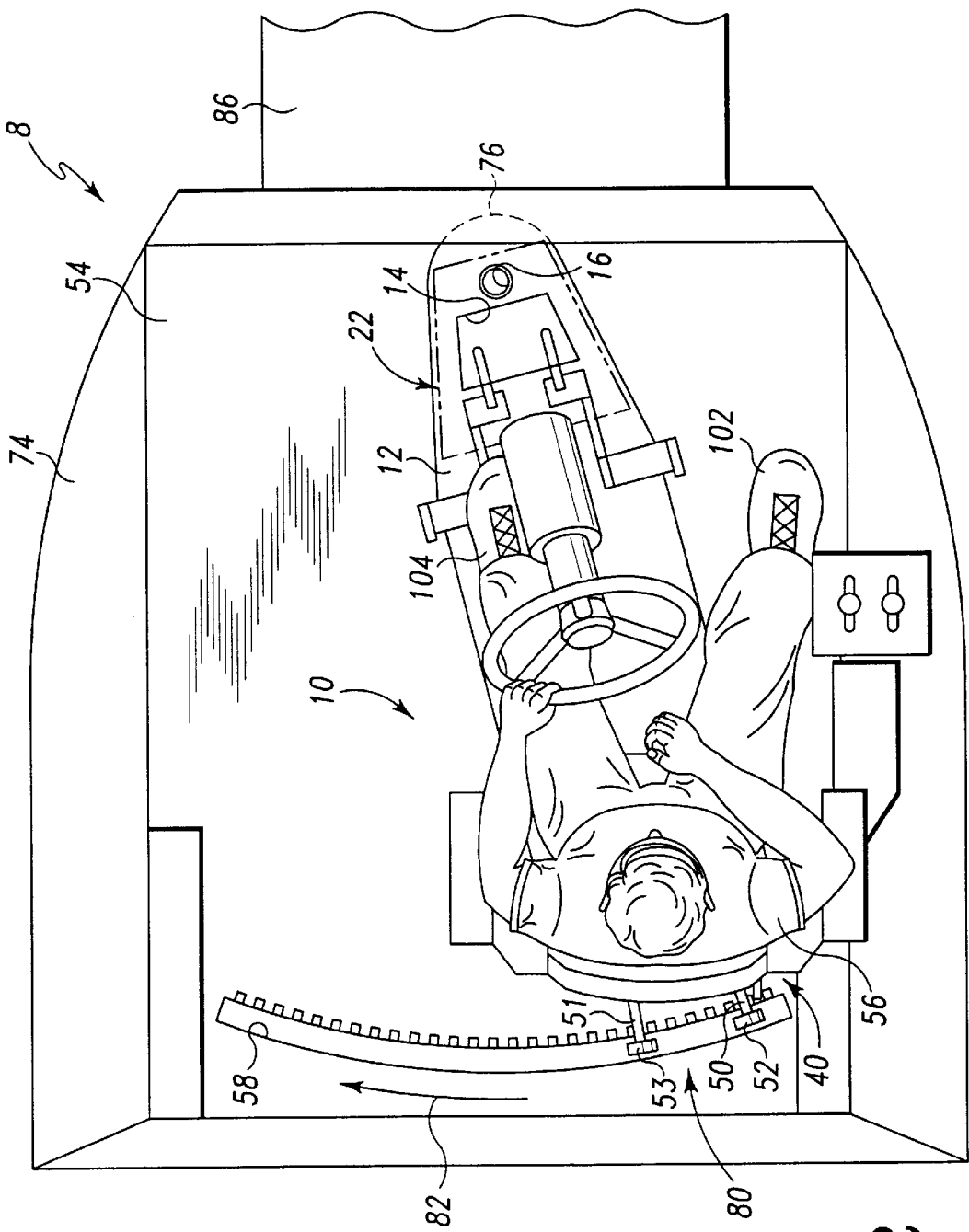
FIG. 2 is a top elevational view of the operator station of FIG. 1 shown positioned in a cab of the work machine and located at a first orientation relative to the cab floor.
Figure 3:
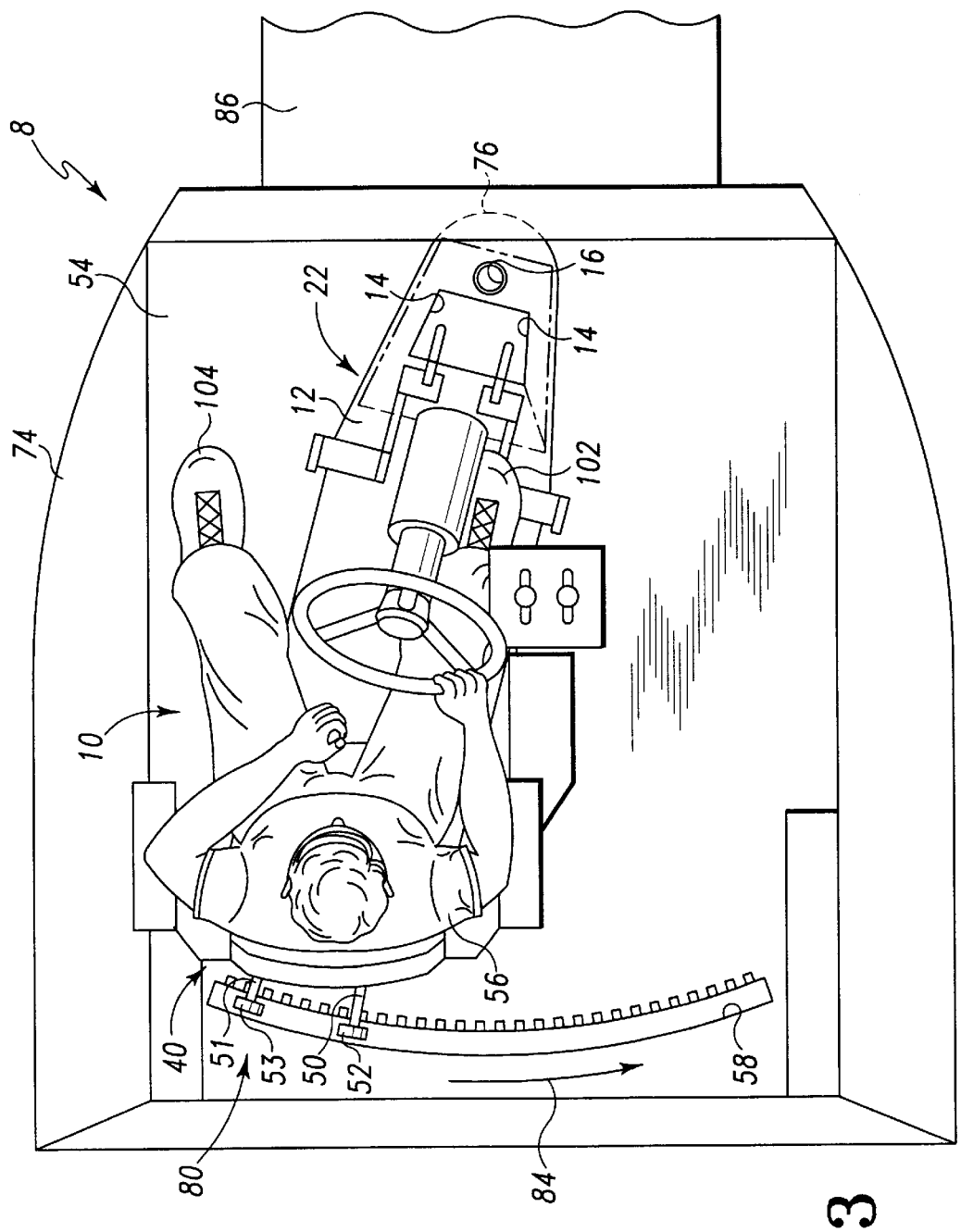
FIG. 3 is a view similar to FIG. 2, but showing the operator station located at a second orientation relative to the cab floor.

Referring now to FIGS. 1–3, there is shown a portion of a work machine 8 (e.g. an agricultural tractor) which incorporates the features of the present invention therein. Work machine 8 includes a cab 74 having a floor 54 with a substantially U-shaped track 58 defined therein (hereinafter referred to as track 58). The work machine 8 further includes an engine compartment 86 positioned in front of cab 74 as shown in FIGS. 2 and 3. Work machine 8 also includes an operator station 10 positioned within cab 74. Operator station 10 includes a support structure 12, a pair of rollers 80 (see FIGS. 2 and 3), a control console 22, and a seat assembly 40.

Support structure 12 has a first end portion 76 and a second end portion 78 (see FIG. 1). Support structure 12 also has an opening 14 and a pin hole 16 defined therein adjacent to first end portion 76. A boss 18 (see FIG. 1) is attached to an underside 88 of support structure 12 such that a passageway (not shown) defined in boss 18 aligns with pin hole 16.

The pair of rollers 80 includes a roller 52 and a roller 53 (see FIGS. 2 and 3). Roller 52 and roller 53 are attached to and extend from second end portion 78 of support structure 12 via shafts 50 and 51 (see FIGS. 2 and 3), respectively.

As more clearly shown in FIG. 1, control console 22 includes a wall member 20, a steering housing 24 (shown in phantom for clarity of description), a steering column 26, and a steering wheel 28. Control console 22 also includes a clutch pedal 32 and a brake pedal 34. Wall member 20 is attached to support structure 12 such that wall member 20 extends upwardly from support structure 12 and partially surrounds opening 14. Steering housing 24 is attached to support structure 12 and wall member 20 such that steering housing 24 also extends upwardly from support structure 12. Steering column 26 is secured to steering housing 24 such that steering column 26 extends from steering housing 24 in the direction of seat assembly 40. Clutch pedal 32 and brake pedal 34 are secured to wall member 20 such that clutch pedal 32 and a brake pedal 34 face seat assembly 40.

It should be understood that steering wheel 28, clutch pedal 32, and a brake pedal 34 are coupled to the appropriate components of work machine 8 in a well known manner by passing linkages or other driving apparatus (not shown) through opening 14 in support structure 12.

Seat assembly 40 includes a support member 38, an adjustment member 44, a seat 42, and a control support member 46. Support member 38 is secured adjacent to second end portion 78 of support structure 12 (see FIG. 1). Adjustment member 44 is positioned on top of, and secured to, support member 38. Seat 42 is secured to adjustment member 44 such that adjustment member 44 is interposed between seat 42 and support member 38. Control support member 46 is attached to a side portion 92 of seat 42. It should be appreciated that seat 42 is secured to adjustment member 44 such that seat 42 and control support member 46 can rotate relative to support structure 12 in the directions indicated by arrow 112 as shown in FIG. 1.

Seat assembly 40 also has a locking mechanism 62 (see also FIGS. 4 and 5) which includes a locking rod 64 having a locking end 66 and a bent portion 68. As shown in FIGS. 4 and 5, locking mechanism 62 also includes a biasing member 70 (e.g. a spring), a bracket 90, and a series of teeth 60 secured to floor 54 adjacent to track 58. Locking rod 64 of locking mechanism 62 extends through support member 38 such that (i) locking end 66 extends out a back portion 94 of support member 38 via bracket 110 and (ii) bent portion 68 extends out of a front portion 96 of support member 38 via bracket 106. Locking rod 64 is also secured to one end of biasing member 70 via bracket 90. The other end of biasing member 70 is secured to support member 38 via bracket 108.

Now referring back to FIG. 1, operator station 10 is positioned relative to floor 54 such that boss 18 extends through a hole 98 defined through floor 54. A pivot pin 36 is then inserted through pin hole 16 and the passageway defined through boss 18 so as to pivotally mount support structure 12 to floor 54. Operator station 10 is further positioned relative to floor 54 such that roller 52 and roller 53 are positioned within track 58 (see FIGS. 2 and 3). Operator station 10 is still further positioned relative to floor 54 such that locking end 66 of locking rod 64 is interposed between adjacent teeth 60 as shown in FIG. 4. It should be understood that when locking end 66 is interposed between adjacent teeth 60, locking rod 64 is positioned in the locked position and biasing member 70 maintains locking rod 64 in the locked position. However, it should also be understood that locking end 66 can be removed from between adjacent teeth 60 by moving locking rod 64 in a direction indicated by arrow 100 until locking rod 64 is located in the unlocked position as shown in FIG. 5.

INDUSTRIAL APPLICABILITY

During use of operator station 10, an operator 56 is positioned within seat 42 as shown in FIGS. 1–3. Once positioned within seat 42, operator 56 has access to steering wheel 28, clutch pedal 32, brake pedal 34, and a pair of control levers 48. Therefore, operator 56 can control work machine 8 and any implement (not shown) attached thereto.

Once positioned in the above described manner, operator 56 can also move operator station 10 relative to floor 54 from a first orientation, as shown in FIG. 2, to a second orientation, as shown in FIG. 3. In order to move operator station 10 in the above described manner, operator 56 reaches down with a hand and grasps bent portion 68 of locking rod 64. Operator 56 then applies force to locking rod 64 in the direction indicated by arrow 100 (see FIG. 4) until locking end 66 of locking rod 64 is no longer interposed between adjacent teeth 60, i.e. locking rod 64 is located in the unlocked position as shown in FIG. 5. Once locking rod is located in the unlocked position, operator 56 places a foot 102 on floor 54 (see FIGS. 1 and 2) and pushes support structure 12 in a direction indicated by arrow 82 as shown in FIG. 2. Pushing support structure 12 in the above described manner causes rollers 52 and 53 to roll in track 58 in an arcuate manner in the direction indicated by arrow 82, and thus causes operator station 10 to move relative to floor 54 in the direction of arrow 82 until operator station 10 is positioned in the second orientation as shown in FIG. 3. Once operator station 10 is positioned in the second orientation, operator 56 releases bent portion 68 of locking rod 64 such that biasing member 70 forces locking end 66 back in between adjacent teeth 60, i.e. biasing member 70 forces locking rod 64 into the locked position so that operator station can no longer substantially move relative to floor 54. However, it should be understood that operator can reposition operator station 10 back in the first orientation (see FIG. 2) by repeating the above described procedure with the exception that a foot 104 is placed on floor 54 and support structure 12 is pushed a direction indicated by arrow 84 as shown in FIG. 3. It should also be understood that operator station 10 can be placed in any one of a plurality of orientations between the first orientation and the second orientation by positioning support structure 12 at the desired location and placing locking rod 64 in the locked position.

Being able to position operator station 10 in the above described manner is an important advantage of the present invention since it allows operator 56 to optimize his or her view from cab 74 during the performance of a work function. Specifically, positioning operator station 10 in the above described manner allows operator 56 to see around engine compartment 86 without having to lean to the left or the right, and thus avoids any muscle fatigue associated therewith.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, U-shaped track 58 can be substituted with a substantially C-shaped track, i.e., a track having a transverse cross section which defines a C-shape. The C-shaped track would be attached to floor 54 such that the open side of the C-shaped track faces support structure 12. Rollers 52 and 53 would be positioned within the C-shaped track such that shafts 50 and 51 extend through the open side thereof and are attached to the second end 78 of support structure 12. Having a C-shaped track with rollers 52 and 53 positioned therein functions to improve the stability of operator station 10. Specifically, having the above described arrangement ensures that rollers 52 and 53 will remain within the C-shaped track even when work machine 8 encounters bumps or obstacles that might otherwise cause rollers 52 and 53 to "jump" out of U-shaped track 58.

In addition, while rollers 52 and 53 are shown extending from support structure 12, it should be understood that a slide or bearing member could be substituted for rollers 52 and 53. The slide member could be made from a plastic friction reducing material to facilitate the movement thereof over the surface of the floor. The slide member would serve a similar function as that provided by rollers 52 and 53. Specifically, the slide member would extend from support structure 12 such that an end of the slide member is positioned within track 58 so as to allow operator station 10 to pivot relative to floor 54 by sliding in track 58.

What is claimed is:

1. A work machine, comprising:
   a cab having a floor; and
   an operator station having (i) a support structure which is movably mounted to said floor at a first end portion thereof, (ii) a roller which is secured to said support structure at a second end portion thereof, said roller contacts said floor so as to support said support structure above said floor, and (iii) a seat secured to said support structure.

2. The work machine of claim 1, wherein:
   said floor has a track defined therein,
   said support structure is positionable in relation to said floor at a first orientation and a second orientation, and
   said roller is positioned within said track during movement of said support structure from said first orientation to said second orientation.

3. The work machine of claim 2, wherein said track possesses a substantially arcuate shape.

4. The work machine of claim 1, further comprising a pivot pin, wherein said support structure is pivotally mounted to said floor with said pivot pin.

5. The work machine of claim 1, further comprising a locking mechanism for locking said support structure at any one of a plurality of positions relative to said floor.

6. The work machine of claim 5, wherein said locking mechanism includes:
   a plurality of locking teeth secured to said floor,
   a locking rod having a locking end, and
   a spring which biases said locking end into engagement with said locking teeth.

7. The work machine of claim 1, wherein said operator station further has a control console which supports (i) a steering wheel, (ii) a clutch pedal, and (iii) a brake pedal.

8. A method for positioning an operator station relative to a cab floor of a work machine, wherein the operator station has (i) a support structure which is movably mounted to the cab floor at a first end portion thereof, (ii) a roller which is secured to the support structure at a second end portion thereof, (iii) a seat secured to the support structure, and (iv) a locking mechanism for locking said support structure in relation to said floor, comprising the steps of:
   unlocking the support structure in relation to the cab floor when the support structure possesses a first orientation relative to the cab floor;
   rolling the support structure on the roller in an arcuate path of movement from the first orientation in relation to the cab floor to a second orientation in relation to the cab floor; and
   locking the support structure in relation to the cab floor when the support structure possesses the second orientation in relation to the cab floor.

9. The method of claim 8, wherein:
   said cab floor has a track defined therein, and
   said roller is positioned within said track during the rolling step.

10. The method of claim 8, further comprising a pivot pin, wherein said rolling step includes the step of pivoting the support structure about the pivot pin.

11. The method of claim 8, wherein:
    the locking mechanism includes (i) a series of locking teeth secured to said cab floor, and (ii) a locking rod having an locking end, and
    the locking step includes the step of spring biasing the locking end into engagement with the locking teeth.

12. The method of claim 8, wherein:
    the operator station further has a control console which supports (i) a steering wheel, (ii) a clutch pedal, and (iii) a brake pedal, and
    the rolling step includes the step of moving the control console from a first console position to a second console position.

13. A work machine, comprising:
    a cab having a floor;
    an operator station having (i) a platform which is pivotally mounted to said floor, (ii) a pair of rollers which are secured to said platform, said pair of rollers contact said floor so as to support said platform above said floor, and (iii) a seat secured to said platform; and
    a locking mechanism for locking said platform at any one of a plurality of positions relative to said floor.

14. The work machine of claim 13, wherein:
    said floor has a track defined therein,
    said platform is positionable in relation to said floor at a first orientation and a second orientation, and
    said pair of rollers are positioned within said track during movement of said platform from said first orientation to said second orientation.

15. The work machine of claim 14, wherein said track possesses a substantially arcuate shape.

16. The work machine of claim 13, further comprising a pivot pin, wherein said platform is pivotally mounted to said floor with said pivot pin.

17. The work machine of claim 13, wherein said locking mechanism includes:
    a series of locking teeth secured to said floor,
    a locking rod having a locking end, and
    a spring which biases said locking end into engagement with said locking teeth.

18. The work machine of claim 13, wherein said operator station further has a control console which supports (i) a steering wheel, (ii) a clutch pedal, and (iii) a brake pedal.

19. A work machine, comprising:

a cab having a floor;

an operator station having (i) a support structure which is movably mounted to said floor at a first end portion thereof, (ii) a bearing member which is secured to said support structure at a second end portion thereof, said bearing member contacts said floor so as to support said support structure above said floor, and (iii) a seat secured to said support structure; and a locking mechanism for locking said support structure at any one of a plurality of positions relative to said floor.

20. The work machine of claim 19, wherein:

said floor has a track defined therein, said support structure is positionable in relation to said floor at a first orientation and a second orientation, and said bearing member is positioned within said track during movement of said support structure from said first orientation to said second orientation.

* * * * *